(12) United States Patent
dela Houssaye

(10) Patent No.: US 9,266,576 B1
(45) Date of Patent: Feb. 23, 2016

(54) TAMPER EVIDENT WHEEL SUPPORT

(71) Applicant: Arthur J. dela Houssaye, Houma, LA (US)

(72) Inventor: Arthur J. dela Houssaye, Houma, LA (US)

( * ) Notice: Subject to any disclaimer, the term of this patent is extended or adjusted under 35 U.S.C. 154(b) by 0 days.

(21) Appl. No.: 14/694,460

(22) Filed: Apr. 23, 2015

(51) Int. Cl.
*B65D 55/06* (2006.01)
*B62J 99/00* (2009.01)
*B62K 3/02* (2006.01)

(52) U.S. Cl.
CPC . *B62J 99/00* (2013.01); *B62K 3/02* (2013.01); *B62J 2099/008* (2013.01)

(58) Field of Classification Search
CPC ........ B62J 2099/008; B62J 99/00; B62K 3/02
USPC .............................................. 74/551.1–551.7
See application file for complete search history.

(56) References Cited

U.S. PATENT DOCUMENTS

| 2,073,736 | A | | 3/1937 | Duffy |
| 4,596,507 | A | | 6/1986 | Quinn |
| 4,805,941 | A | | 2/1989 | Downing et al. |
| 5,121,973 | A | * | 6/1992 | Phillips ...................... 301/110.5 |
| 5,449,260 | A | * | 9/1995 | Whittle ......................... 411/377 |
| 5,961,186 | A | * | 10/1999 | Phillips ...................... 301/124.2 |
| 6,418,873 | B1 | | 7/2002 | Chen |
| 6,460,939 | B1 | | 10/2002 | Claes |
| 6,974,275 | B2 | | 12/2005 | Nago et al. |
| 7,918,514 | B2 | | 4/2011 | Dal Pra' |
| 2009/0021026 | A1 | * | 1/2009 | Collier ..................... 292/307 A |
| 2010/0239190 | A1 | * | 9/2010 | McNamara et al. ............. 383/5 |
| 2012/0241451 | A1 | * | 9/2012 | Pether et al. .................. 220/212 |

FOREIGN PATENT DOCUMENTS

| WO | 9221553 A1 | 12/1992 |
| WO | 9524327 A1 | 9/1995 |
| WO | 2009136018 A1 | 11/2009 |

* cited by examiner

*Primary Examiner* — Tony Winner
(74) *Attorney, Agent, or Firm* — McGlinchey Stafford PLLC; R. Andrew Patty, II; Christopher S. Nichols

(57) ABSTRACT

A wheel support for a bicycle and a bicycle are disclosed. The wheel support includes a first end and a second end. The first end is configured to support the bicycle, and the second end is configured to be tamper evident and to support a wheel. The bicycle includes a frame, a wheel, and the wheel support.

18 Claims, 9 Drawing Sheets

US 9,266,576 B1

TAMPER EVIDENT WHEEL SUPPORT

BACKGROUND

The present disclosure relates to a bicycle and/or a wheel support for a bicycle.

Many bicycles have a quick release assembly for securing a hub of a wheel to a wheel support of the bicycle. However, the quick release assembly can accidentally release or fail if the bicycle is subjected to a jarring force such as that occurring when the bicycle wheel encounters a pot hole or a bump on the road. Typically, the wheel support includes a safety retention device for holding the hub in the wheel support even if the quick release assembly accidentally releases or fails.

Sometimes the safety retention device on the wheel support is tampered with (i.e., completely or substantially removed by grinding, filing, sanding and so forth) so that quick release assembly can release the wheel from the wheel support more rapidly. For example, this often happens in the case when the bicycle is resold and the previous owner forgets to tell the subsequent owner that the bicycle has been altered by the removal of the safety retention device(s). Thus, the rider often does not realize that someone has tampered with the safety retention device of the wheel support. Without the retention device, if the quick release assembly inadvertently or accidentally releases or fails, then the wheel can separate from the wheel support, which can cause substantially injury or even death to the rider.

Accordingly, there remains a need in the art for a wheel support that is tamper evident.

BRIEF SUMMARY

The invention meets the foregoing and/or other needs by providing at least in some aspects of the invention, a wheel support for a bicycle having a first end for supporting the bicycle, and a second end for supporting a wheel. The second end is configured to be tamper evident.

In another aspect, the invention provides a bicycle including a frame, a wheel, and a wheel support. The wheel support includes a first end and a second end. The wheel support is coupled to the frame at the first end and supports the wheel at the second end. The second end of the wheel support is configured to be tamper evident.

The above brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the above brief summary has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate preferred embodiments of this invention. However, it is to be understood that these embodiments are not intended to be exhaustive, nor limiting of the invention. These embodiments are but examples of some of the forms in which the invention may be practiced. Like reference numbers or symbols employed across the several figures are employed to refer to like parts or components illustrated therein.

DETAILED DESCRIPTION OF THE INVENTION

Figure 1:
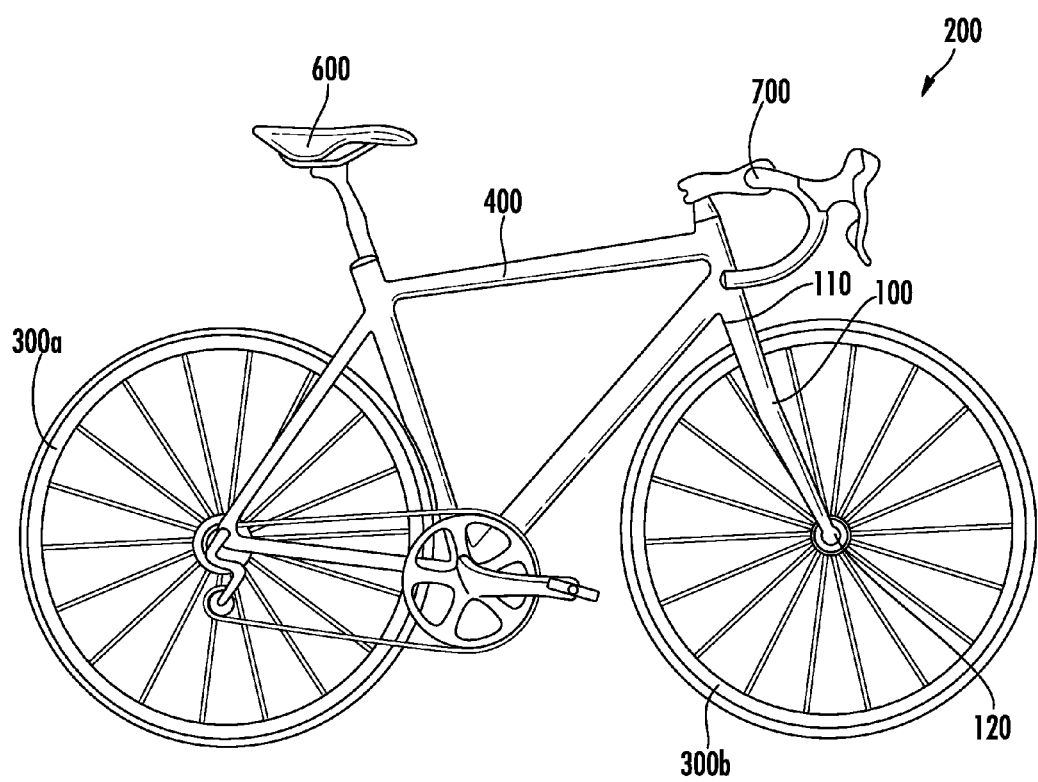
FIG. 1 illustrates an embodiment of a bicycle with a wheel support in accordance with this invention.
Figure 2:
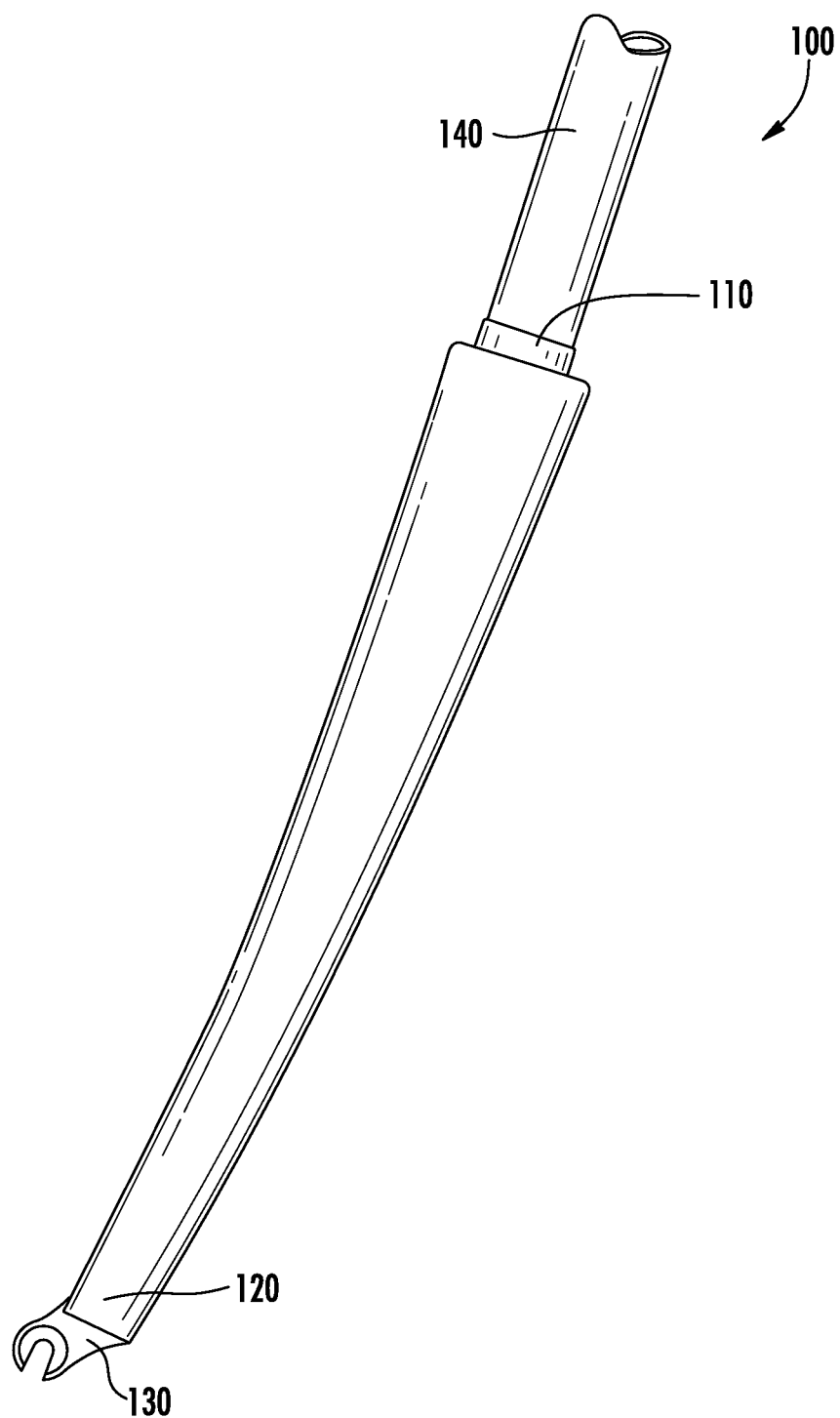
FIG. 2 illustrates a side view of an embodiment of a wheel support in accordance with this invention.

Without any intent to limit the scope of this invention, reference is made to the figures in describing various embodiments of the invention. FIGS. 1-2 and 6-8 illustrate various embodiments of a wheel support 100 and/or a bicycle 200 in accordance with certain aspects of this invention. FIG. 1 illustrates a bicycle 200 in accordance with certain aspects of this invention. The bicycle 200 comprises a wheel support 100, a wheel 300, a frame 400. The frame 400 supports a seat 600 and a rear wheel 300*a*, and the wheel support 100 supports a handlebar 700 and a front wheel 300*b*. A rider sits on the seat 600 and pedals the bicycle 200 to rotate the rear wheel 300*a* and propel the bicycle 200. The wheel support 100 passes through a portion of the frame 400 and pivotally supports the front wheel 300*b* so that the rider is able to steer the bicycle 200. A stem 140 is attached to, or is formed as part of, the wheel support 100 and facilitates the attachment of the handlebar 700 to the wheel support 100. It should be noted that the bicycle 200 shown in FIG. 1 is but one example of a bicycle suited to use with the present invention. As such, the present invention should not be limited to the illustrated example.

The wheel support 100 comprises an elongated body having a first end 100 and a second end 120. The wheel support 100 is coupled to the frame 400 at the first end 110, and is coupled to a hub 301 of the wheel 300 at the second end 120 to support the wheel 300. The second end 120 of the wheel support 100 is configured to be tamper evident. The second end 120 of the wheel support 100 comprises at least one dropout 130. For example, in one aspect, the wheel support 100 can comprise a front fork with two substantially parallel arms extending from the first end 110 of the wheel support 100. The second end 120 of the wheel support 300 can comprise a set of substantially "C" shaped dropouts 130 that are configured to accept and support the hub 301 of the wheel 300.

The dropout 130 comprises an inner surface 131, an outer surface 132, a safety retention device 133, and a tamper indicator 136. The safety retention device 133 is configured to prevent the wheel 300 from separating from the wheel support 100. In one aspect, the safety retention device 133 comprises a raised surface 134 protruding from the dropout 130 to form a restraining surface 135. For example, the safety retention device 133 can comprise a tab such as a lawyer tab or lawyer lips. The safety retention device 133 is preferably provided on at least one of the inner surface 131 and the outer surface 132. The restraining surface 135 is configured to prevent the wheel 300 from separating from the wheel support 100, e.g., in the event that a quick release assembly 500 inadvertently or accidentally releases or fails.

The tamper indicator 136 is configured to be exposed and provide an indication to a person if the safety retention device 133 is tampered with or substantially worn. In a preferred embodiment, the tamper indicator 136 will not be exposed when subjected to normal non-detrimental wear. However, in the case of significant and detrimental wear to the safety retention device 133, the tamper indicator 136 will become exposed and provide an indication that the safety retention device is compromised. For example, the tamper indicator 136 can be configured to be optically discernible from the safety retention device 133 thereby providing the indication that the safety retention device has been tampered with or substantially worn. The tamper indicator 136 can have a first visual effect and the safety retention device 133 can have a second visual effect, e.g., red color and black color, red color and silver color, white color and black color, glossy finish and matte finish, shimmering effect and non-shimmering effect, and so forth.

In one aspect, the tamper indicator 136 comprises an inner core located on the dropout 130 or positioned between the inner surface 131 and the outer surface 132 of the dropout 130. For example, the tamper indicator 136 can be embedded in the second end 120 of the wheel support 100, e.g., in the dropout 130 and/or safety retention device 133. In this configuration, if the safety retention device 133 is tampered with or substantially worn (e.g., ground off, worn off, or otherwise substantially removed from the dropout 130), then at least a portion of the tamper indicator 136 will be exposed to provide a visual indication to an individual such as the rider. The height of the tamper indicator 136 is preferably about 2 millimeters, and the length of the tamper indicator 136 is preferably about 8 millimeters. However, it should be appreciated that the dimensions of the tamper indicator 136 can be varied depending on the specifications of the wheel support 100 and/or tamper indicator 136 (e.g., dimensions of the second end and/or dropout, materials of construction, and so forth). The tamper indicator 136 is preferably constructed from anodized aluminum, but it can be constructed from any suitable material including, but not limited to, metals, metal alloys, plastics, carbon fiber, and so forth.

The operation of a wheel support 100 and/or a bicycle 200 in accordance with this invention will now be discussed with reference to the figures. In operation, a bicycle is provided with a wheel support 100, a wheel 300, a frame 400. The wheel support 100 is coupled to the frame 400 at its first end 110, and is coupled to a hub 301 of the wheel 300 at its second end 120 to support the wheel 300. The second end 120 of the wheel support 100 has at least one dropout 130 with a safety retention device 133. If someone or something tampers with the safety retention device 133 (e.g., lawyer tabs are filed off, ground off, or otherwise substantially removed from the dropout 130), then at least a portion of the tamper indicator 136 will be exposed thereby providing an indication (e.g., optically discernible color) to an individual such as the rider. The indication should alert the individual that the safety retention device 133 may be compromised thereby presenting a potentially unsafe riding condition that requires additional attention before riding the bicycle 200.

Figure 3:
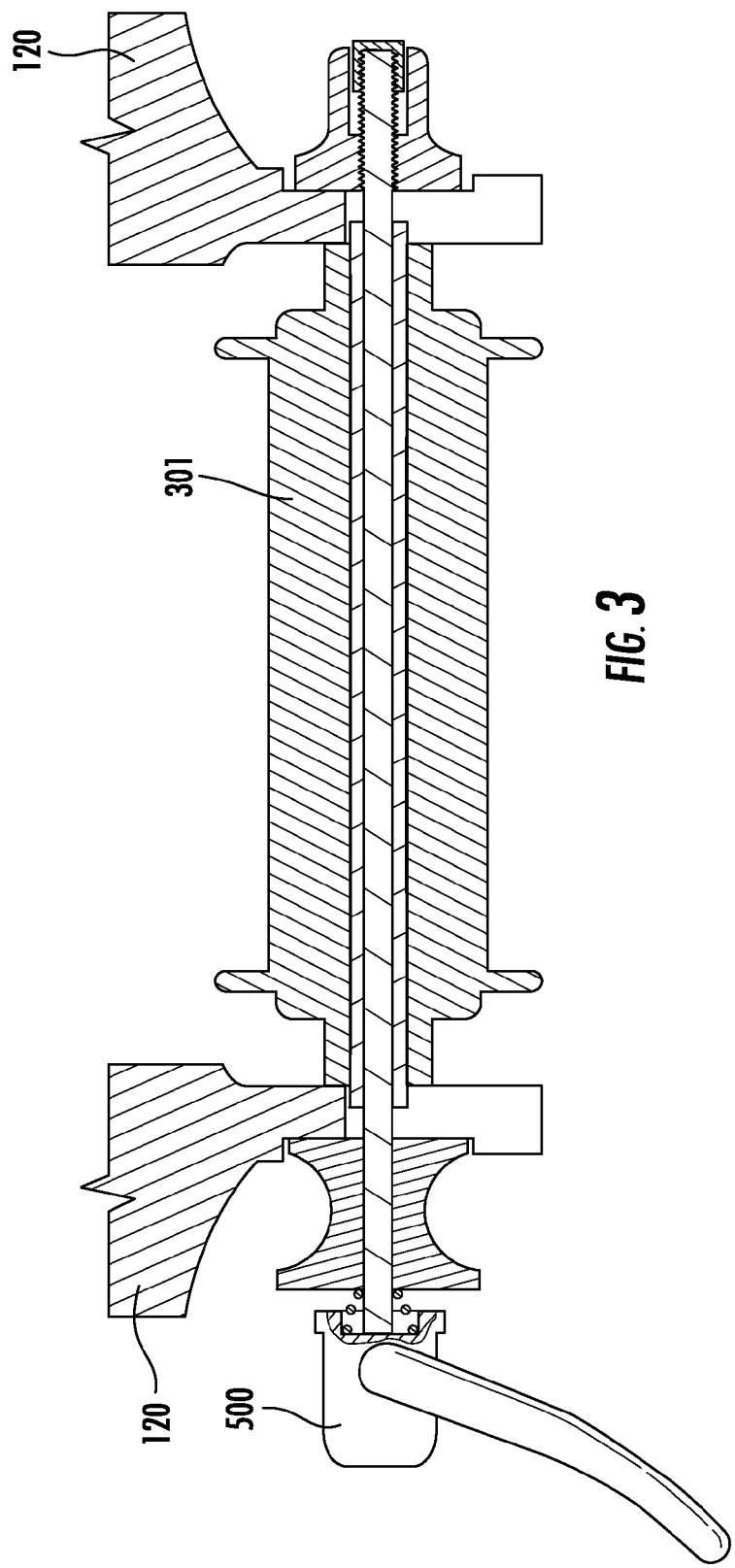
FIG. 3 illustrates a second end of a wheel support secured to a hub of a wheel.
Figure 4:
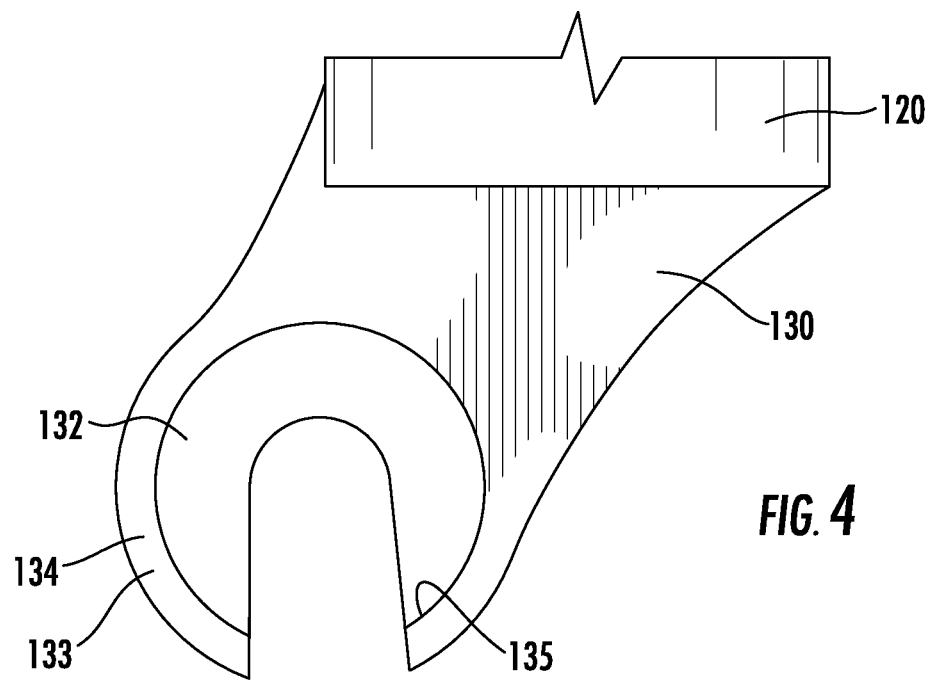
FIG. 4 illustrates a second end of a wheel support having a safety retention device.
Figure 5:
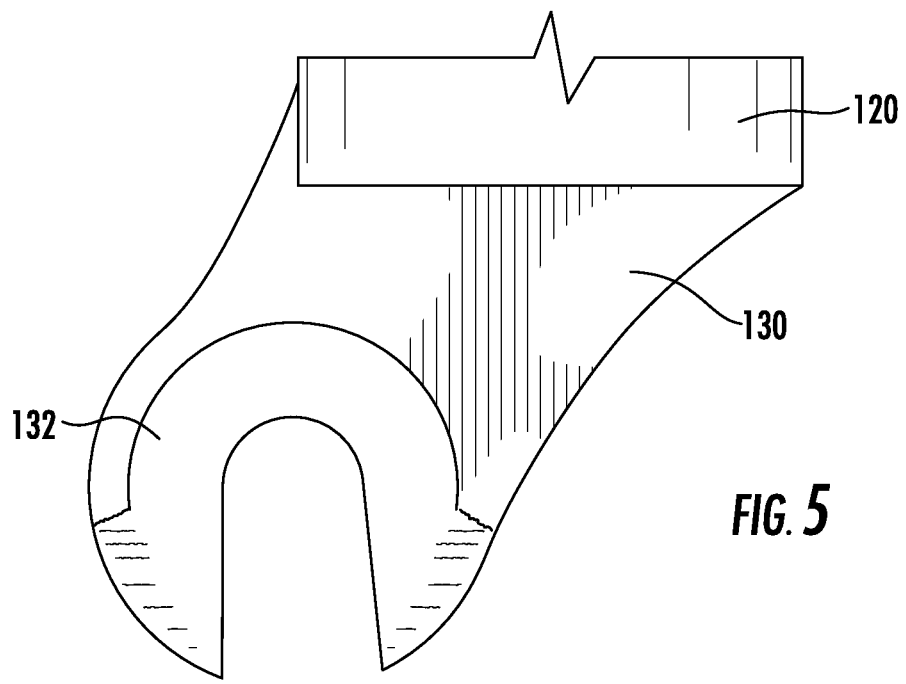
FIG. 5 illustrates a second end of a wheel support with the safety retention device tampered with or substantially worn.
Figure 6:
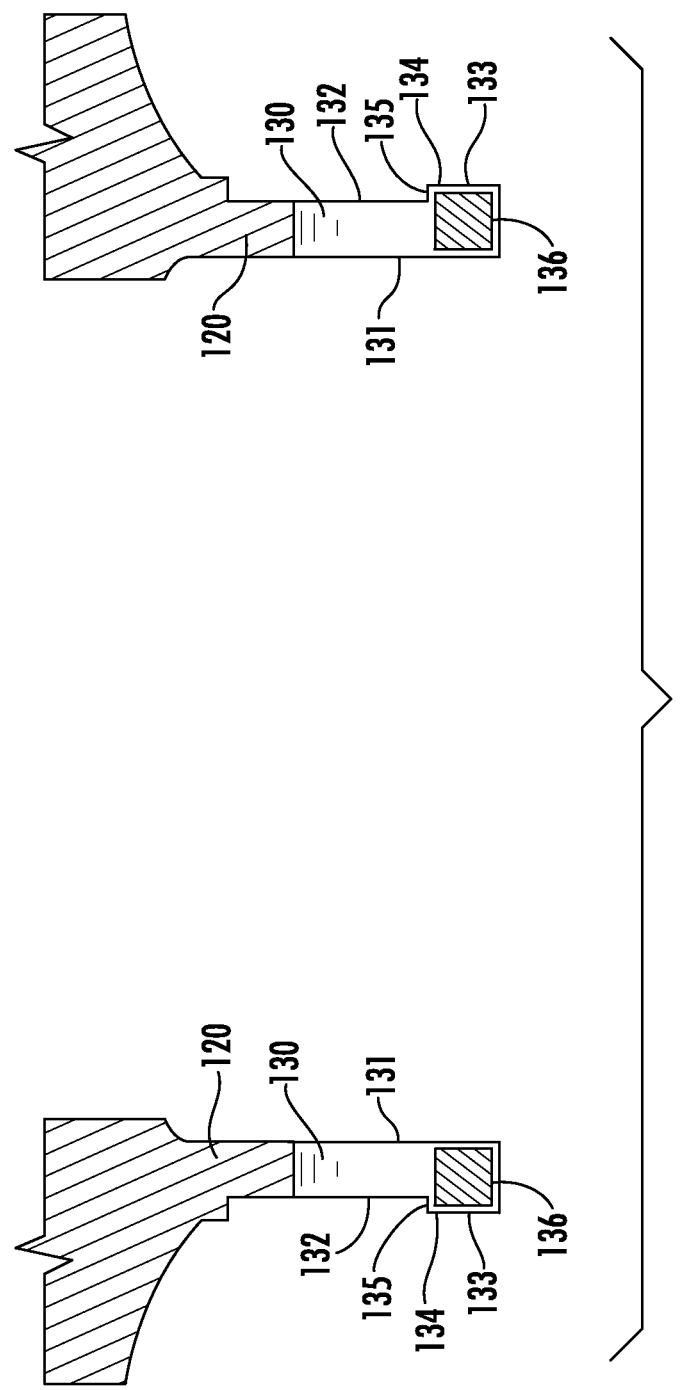
FIG. 6 illustrates an embodiment of a second end of a wheel support in accordance with this invention.
Figure 7:
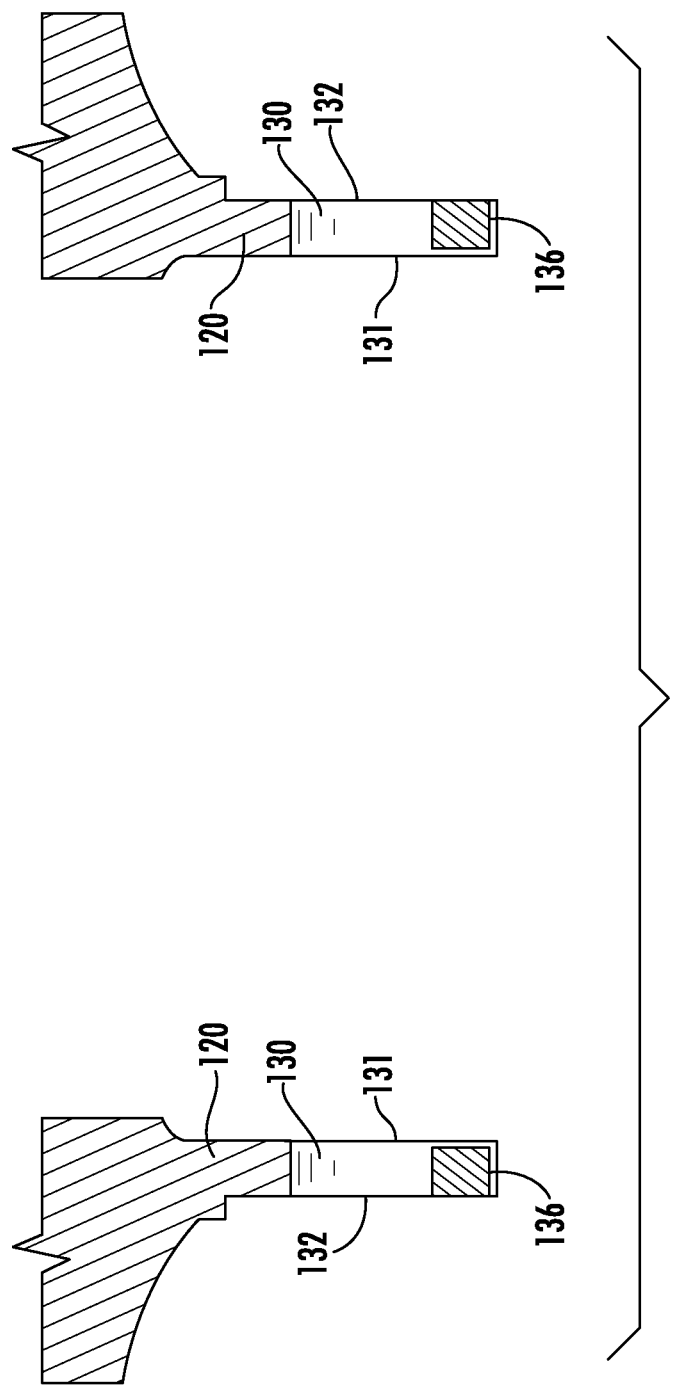
FIG. 7 illustrates an embodiment of a second end of a wheel support in accordance with this invention with the safety retention device tampered with or substantially worn.
Figure 8:
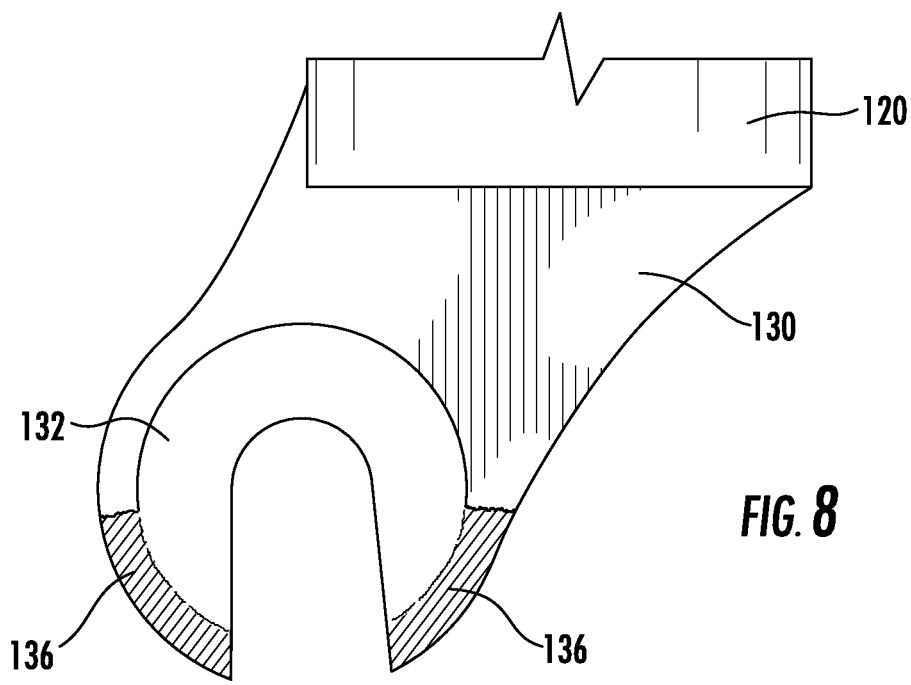
FIG. 8 illustrates an embodiment of a second end of a wheel support in accordance with this invention with the safety retention device tampered with or substantially worn.

Contrast the above described operation with the operation of a wheel support 100 and/or bicycle without a tamper indicator as shown in FIGS. 3-5. If someone or something tampers with the safety retention device 133, e.g., lawyer tabs are filed, ground, or otherwise removed from the dropout 130, then the rider will probably not receive any substantially noticeable indication (e.g, optically discernible color) that the safety retention device 133 has been tampered with. As a result, the rider probably will not realize that the safety retention device 133 may be compromised. In such a situation, if the quick release assembly 500 inadvertently or accidentally releases or fails, then the wheel support 100 can separate from the hub 301 of the wheel 300, which may cause the substantial injury or even death. to the rider.

Figure 9:
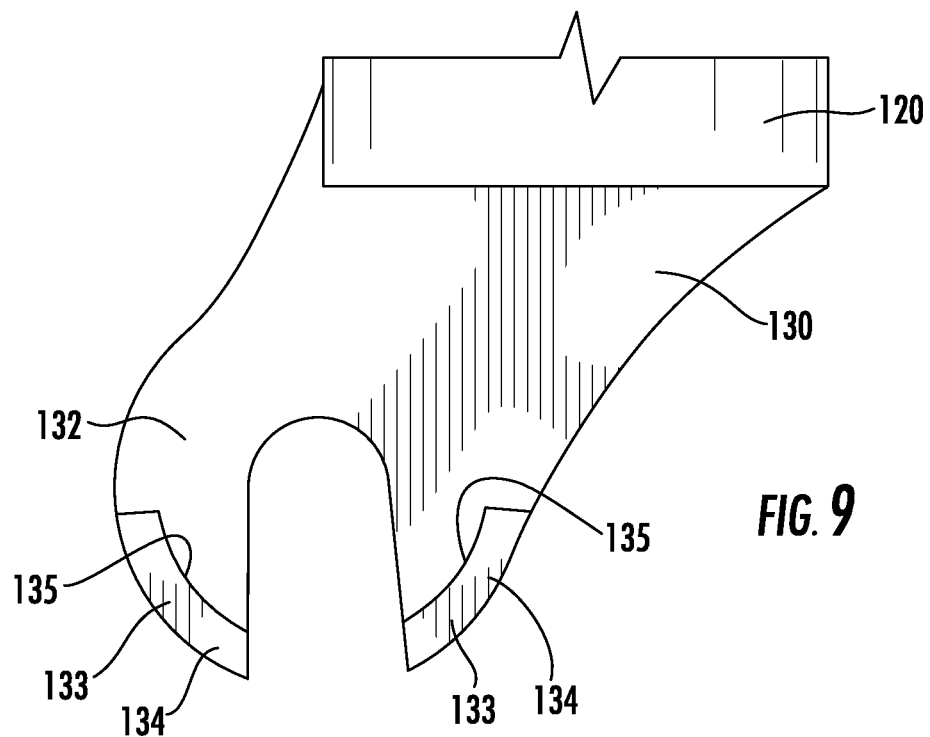
FIG. 9 illustrates another embodiment of a second end of a wheel support having a safety retention device.
Figure 10:
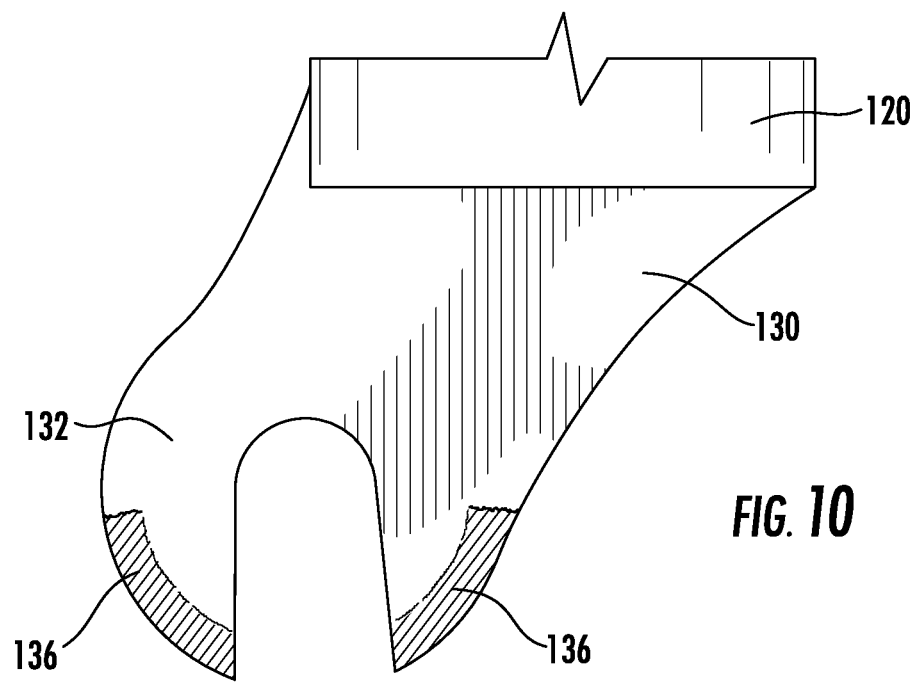
FIG. 10 illustrates the second end of the wheel support shown in FIG. 9 with the safety retention device tampered with or substantially worn.
Figure 11:
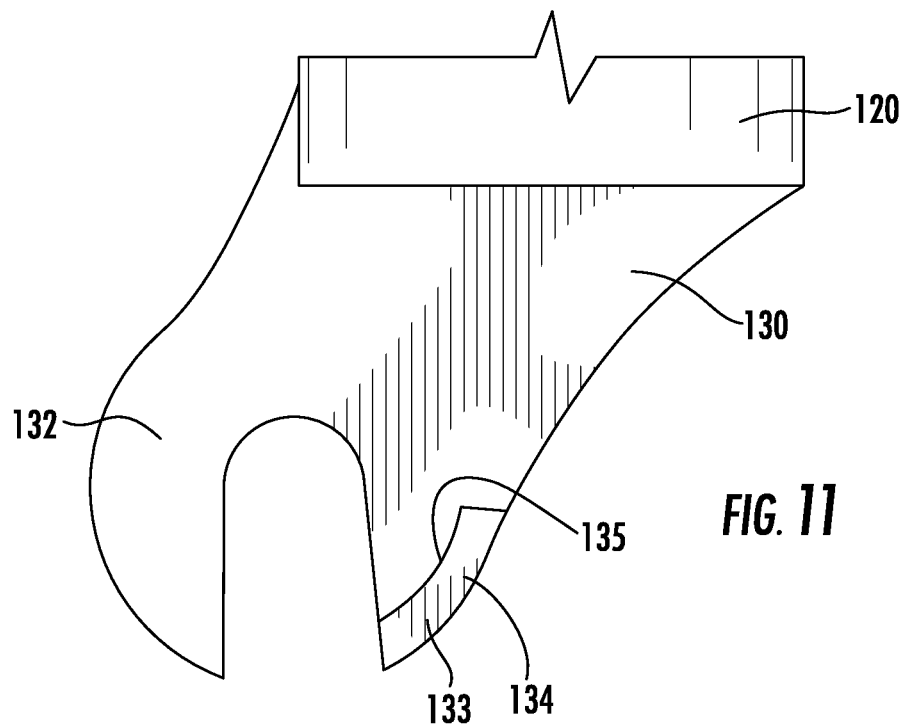
FIG. 11 illustrates another embodiment of a second end of a wheel support having a safety retention device.
Figure 12:
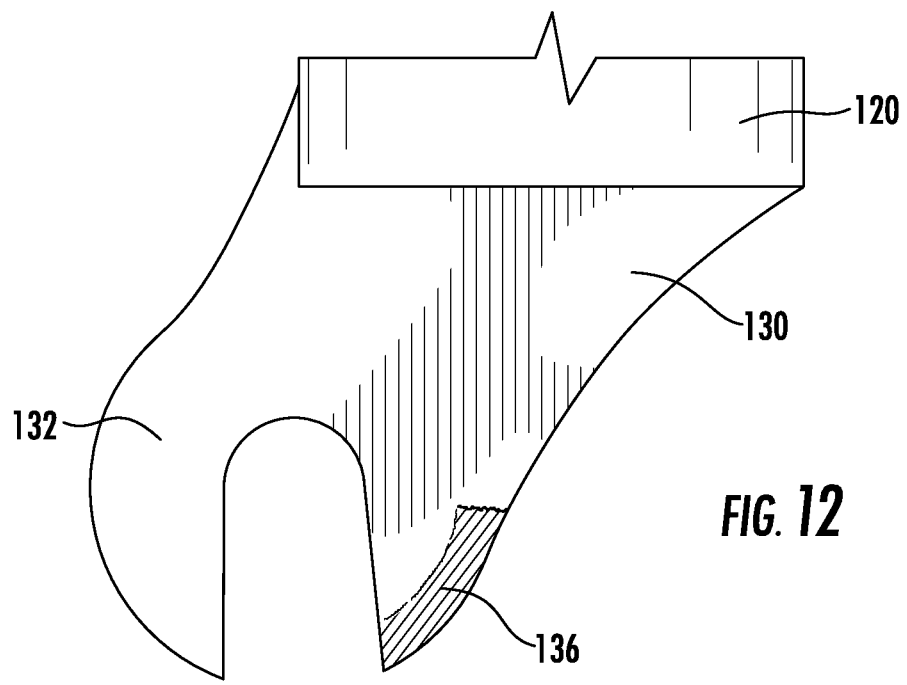
FIG. 12 illustrates the second end of the wheel support shown in FIG. 11 with the safety retention device tampered with or substantially worn.

FIG. 9 illustrates another embodiment of the wheel support 100 having the safety retention device 133 located in two locations. FIG. 10 illustrates the second end 120 of the wheel support 100 shown in FIG. 9 wherein each safety retention device 133 has been tampered with or substantially worn thereby revealing at least a portion of each tamper indicator 136. It should be appreciated that although two safety retention devices 133 and two tamper indicators 136 are provided (i.e., those on the front and rear) in the second end 120 of the wheel support 100 embodiment shown in FIGS. 9 and 10, one safety retention device 133 and one tamper indicator 136 (i.e., front only or rear only) can be utilized in still a further embodiment as shown in FIGS. 11 and 12, which depict an embodiment of a "rear only" configuration.

A wheel support 100 for a bicycle 200 and a bicycle 200 have been disclosed. The wheel support 100 includes a first end 110 and a second end 120. The first end 110 is configured to support the bicycle 200, and the second end 120 is configured to be tamper evident and to support a wheel 300. The bicycle 200 includes a frame 400, a wheel 300, and the wheel support 100.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise. Furthermore, aspects of the invention may comprise, consistent essentially of, or consist of the indicated elements or method steps.

Any reference to patents, documents and other writings contained herein shall not be construed as an admission as to their status with respect to being or not being prior art. Unless the meaning is clearly to the contrary, all ranges set forth herein are deemed to be inclusive of the endpoints. Although the present invention and its advantages have been described in detail, it is understood that the array of features and embodiments taught herein may be combined and rearranged in a large number of additional combinations not directly disclosed, as will be apparent to one having ordinary skill in the art. The invention disclosed herein may be practiced in the absence of any element which is not specifically disclosed herein. It should be understood that various changes, substitutions and alterations can be made herein without departing from the spirit and scope of the invention as defined by the following claims. There are, of course, other embodiments, which are alternatives to the foregoing descriptions of the invention, which are intended to be included within the scope of the invention, as defined by the following claims.

What is claimed is:

1. A wheel support for a bicycle, the wheel support comprising:
   a) a first end for supporting the bicycle; and
   b) a second end for supporting a wheel, the second end comprising a safety retention device and a tamper indicator:
   wherein
   at least a portion of the tamper indicator is covered by the safety retention device and configured to be exposed only if the safety retention device is tampered with or substantially worn.

2. The wheel support of claim 1 wherein the tamper indicator is positioned between an inner surface and an outer surface of the second end.

3. The wheel support of claim 2 wherein the tamper indicator is configured to provide a visual indication if the safety retention device is tampered with or substantially worn.

4. The wheel support of claim 3 wherein the wheel support is a front fork.

5. The wheel support of claim 3 wherein the safety retention device is provided on at least one of the inner surface and the outer surface.

6. The wheel support of claim 1 wherein the safety retention device comprises:
   a) a raised surface protruding from the second end to form a restraining surface; wherein
   the restraining surface is configured to prevent the wheel from separating from the wheel support.

7. A bicycle comprising:
   a) a frame;
   b) a wheel; and
   c) a wheel support comprising a first end and a second end, the second end comprising a safety retention device and a tamper indicator: wherein
   the wheel support is coupled to the frame at the first end and supports the wheel at the second end; and
   at least a portion of the tamper indicator is covered by the safety retention device and configured to be exposed only if the safety retention device is tampered with or substantially worn.

8. The bicycle of claim 7 wherein the tamper indicator is positioned between an inner surface and an outer surface of the second end.

9. The bicycle of claim 7 wherein the safety retention device comprises:
   a) a raised surface protruding from the second end to form a restraining surface; wherein
   the restraining surface is configured to prevent the wheel from separating from the wheel support.

10. The bicycle of claim 7 wherein the tamper indicator is configured to provide a visual indication if the safety retention device is tampered with or substantially worn.

11. The bicycle of claim 10 wherein the wheel support is a front fork.

12. The bicycle of claim 10 wherein the safety retention device is provided on at least one of the inner surface and the outer surface.

13. A wheel support for a bicycle, the wheel support having an elongated body, the wheel support comprising:
   a) a first end for supporting the bicycle; and
   b) a second end for supporting a wheel, the second end comprising a dropout, the dropout having an inner surface, an outer surface, a safety retention device and a tamper indicator;
   wherein
   at least a portion of the tamper indicator is covered by the safety retention device and configured to be exposed only if the safety retention device is tampered with or substantially worn.

14. The wheel support of claim 13 wherein the tamper indicator is embedded in the dropout.

15. The wheel support of claim 14 wherein the tamper indicator is optically discernible from the safety retention device thereby providing an indication that the safety retention device has been tampered with or substantially worn.

16. The wheel support of claim 15 wherein the safety retention device comprises a raised surface protruding from the dropout to form a restraining surface;
   wherein
   the restraining surface is configured to prevent the wheel from separating from the wheel support.

17. The wheel support of claim 16 wherein the safety retention device comprises a lawyer tab or a lawyer lip.

18. The wheel support of claim 14 wherein the safety retention device is located on the inner surface and/or the outer surface.

* * * * *